(12) United States Patent
Kajander

(10) Patent No.: US 7,473,440 B2
(45) Date of Patent: Jan. 6, 2009

(54) METHOD OF TREATING A COATED FIBROUS MAT

(75) Inventor: Richard Emil Kajander, Toledo, OH (US)

(73) Assignee: Johns Manville, Denver, CO (US)

( * ) Notice: Subject to any disclaimer, the term of this patent is extended or adjusted under 35 U.S.C. 154(b) by 235 days.

(21) Appl. No.: 11/254,489

(22) Filed: Oct. 20, 2005

(65) Prior Publication Data
US 2007/0093159 A1    Apr. 26, 2007

(51) Int. Cl.
B05D 3/02 (2006.01)
(52) U.S. Cl. .................. 427/379; 427/407.3; 427/412
(58) Field of Classification Search .............. 427/407.3, 427/412, 379, 497.3, 47.3
See application file for complete search history.

(56) References Cited

U.S. PATENT DOCUMENTS

| | | | |
|---|---|---|---|
| 3,766,003 A | 10/1973 | Schuller et al. | |
| 4,112,174 A | 9/1978 | Hannes et al. | |
| 4,129,674 A | 12/1978 | Hannes et al. | |
| 4,647,496 A | 3/1987 | Lehnert et al. | |
| 4,681,802 A | 7/1987 | Gaa et al. | |
| 4,810,576 A | 3/1989 | Gaa et al. | |
| 4,879,173 A | 11/1989 | Randall | |
| 5,112,678 A | 5/1992 | Gay et al. | |
| 5,342,680 A | 8/1994 | Randall | |
| 5,397,631 A | 3/1995 | Green et al. | |
| 5,401,599 A | 3/1995 | Tahara et al. | |
| 5,484,653 A | 1/1996 | Kennedy et al. | |
| 5,552,187 A | 9/1996 | Green et al. | |
| 5,718,406 A | 2/1998 | Long | |
| 5,772,846 A * | 6/1998 | Jaffee | 162/145 |
| 5,981,406 A | 11/1999 | Randall | |
| 6,165,308 A * | 12/2000 | Chen et al. | 156/289 |
| 6,187,697 B1 * | 2/2001 | Jaffee et al. | 442/149 |
| 6,432,482 B1 | 8/2002 | Jaffee et al. | |
| 6,723,670 B2 * | 4/2004 | Kajander et al. | 442/374 |
| 2003/0031854 A1* | 2/2003 | Kajander et al. | 428/304.4 |
| 2003/0134079 A1 | 7/2003 | Bush et al. | |
| 2005/0142348 A1* | 6/2005 | Kajander et al. | 428/316.6 |

* cited by examiner

Primary Examiner—Erma Cameron
(74) Attorney, Agent, or Firm—Robert D. Touslee

(57) ABSTRACT

Coated and uncoated fibrous mats, and laminates containing the mat, having one or more surfactants on the fibers and binder holding the fibers together in only a portion of the thickness of the mat are disclosed. The mat contains a major portion of non-cellulosic fibers and a minor portion of cured resinous binder with the most typical fibers being glass fibers. The surfactant on the surface of the fibers causes a slurry or other liquid applied to the mat in a later process to form a board or laminate like faced gypsum board, a faced foam board, etc. to uniformly penetrate the mat to the desired distance. Also disclosed are methods of applying the surfactant(s) to the hot, coated or uncoated, mat soon after the coated or uncoated mat exits a drying oven used in the process of making, or coating, the mat.

6 Claims, 2 Drawing Sheets

METHOD OF TREATING A COATED FIBROUS MAT

The invention involves a coated or uncoated fibrous mat having a small amount of one or more surfactants on the fibers on the backside-portion or uncoated portion of the mat, laminates containing such mats and the method of making the mat of the invention. Such mats have many uses, but are especially useful in producing laminates such as a faced gypsum wallboard, foam boards and similar products.

Fibrous non-woven mats containing fibers such as glass and/or synthetic organic fibers bound together with a resin binder are well known. Usually a solution of urea formaldehyde resin, usually modified with a thermoplastic polymer, or one of many other known resin binders is applied to a nonwoven web of fibers and then dried and heated further to cure the urea formaldehyde resin or other resin binder to form a non-woven mat product. The nonwoven webs can be formed dry such as spun bond and melt blown processes or from an aqueous dispersion. Typical wet processes are disclosed in U.S. Pat. Nos. 3,766,003, 4,112,174 and 5,401,599, their disclosure hereby incorporated by reference.

One fiberglass mat (Johns Manville's 7502 Mat, 99 gms/square meter) made using a binder of modified urea formaldehyde resin performed well in the process disclosed in U.S. Pat. No. 4,647,496 to make a faced insulating gypsum board, also disclosed in that patent, but the mat was not as strong as desired which caused process breakouts adding to production costs. This mat was also more rigid than desired which made it difficult to fold around the edges of the board and also irritated the handstand arms of the workers handling and installing the insulating board product. The mat also contained "stand-up fibers" which can cause problems later when the wallboard is painted. To address the inadequate strength problem a small portion of polyester, polyethylene terephthalate (PET), fibers can be used in place of an equal amount of glass fibers and the urea formaldehyde resin binder was replaced with an acrylic binder containing a small amount of a stearylated melamine. This improved the strength adequately and also improved the handling characteristics of the mat somewhat, i. e. the mat is friendlier to those handling and installing the mat or board, but the acrylic bound mat is more expensive and less fire (flame) resistant and still leaves some glass fibers exposed. Such mats are disclosed in U.S. Pat. No. 5,772,846. While the mats disclosed by this latter reference have substantially improved "hand" and cause very little abrasion or discomfort in handling, the cost is higher, the mat is less flame resistant than the mat disclosed in U.S. Pat. No. 4,647,496 and further improvement is still desired by some users.

A great amount of work has been done to try to eliminate the "stand up fiber" problem including coating the nonwoven fiberglass mats. U.S. Pat. No. 5,112,678 discloses coating compositions aimed at solving this problem containing inorganic compounds such as limestone, clay, quicklime, etc. and up to 5 percent of a polymer binder, but the coating weight was very high at 15-120 pounds per thousand square feet and this coating did not provide all the results desired for some applications such as a facer for gypsum board. This patent does not disclose the method of coating, but instead states "the coating was applied with a coater especially designed for porous glass mats", but does not disclose what the special design was. It does disclose that the coating mixture penetrated entirely through the thickness of the mat which suggests that the compositions disclosed are not exactly coatings, but rather are impregnating compositions that can end up thicker than the mat substrate.

U.S. Pat. Nos. 4,879,173, 5,342,680, 5,718,406 and 5,981,406 disclose spraying a reinforcing binder onto one surface of the mat after the mat is placed onto a wet layer of gypsum board slurry. Published U. S. patent application No. 20030134079 discloses a coated fibrous mat for gypsum wallboard reportedly having improved strength versus uncoated mat by controlling the depth of penetration of the coating, but the need for a smoother surface is not addressed. The coating is comprised of water, latex binder, inorganic pigment, and inorganic binder.

For many years problems were encountered where the slurry, foam precursor, etc. bled completely through the mat causing costly housekeeping problems on the rollers, belt or other mat supporting equipment in the board forming processes. Various techniques were used during that time to limit the degree of impregnation of the slurry, foam precursor, etc., e. g. U.S. Pat. Nos. 5,397,631 and 5,552,187 disclose coating a fiberglass mat after the mats are laminated to a gypsum board. The coating compositions comprise 15-35 percent of a resin binder and 20-65 percent filler comprising inorganic compounds that include limestone and calcined clay. The coating composition is applied to the glass mat with a roller. The coated mat attached to the rigid board is then dried in an infra-red oven to produce a heavy coating weight of 50-100 pounds per thousand square feet.

Typically, nonwoven fiber glass mats are coated in a similar manner, but before being used as a facer for forming a rigid board. Processes for coating mats are known including processes shown in U.S. Pat. Nos. 6,187,697, 6,432,482, and numerous off line coating processes that require the dried fibrous mat to be wound into rolls, or stacked up and transported to a secondary coating line, often requiring packaging the rolls or stacks, shipping offsite and storing until unpackaged and run through the coating line.

In using the coated or uncoated fibrous mat to make a laminate by applying a foam, foam precursor, particulate slurry, paste, etc. to one surface of the mat, e.g. a gypsum slurry other board forming slurry the slurry frequently does not adequately penetrate the mat. This can cause delamination and costly product performance or quality problems. In the case of a coated fibrous mat, the slurry, paste, or foam precursor, applied to the uncoated side, does not penetrate all the way to the coating. This incomplete penetration causes air pockets that in turn too often causes blisters, delamination and other problems. The invention addresses this problem.

BRIEF SUMMARY OF THE INVENTION

The present invention includes coated and uncoated fibrous mats having one smooth surface and having one or more surfactants, wetting agents, on the fibers in the uncoated or rougher surface and extending into only a portion of the thickness of the fibrous mat. Some mat embodiments have one surface that is at least as smooth as that of kraft paper facings used on gypsum board. The backside of the mats of the invention have on the surface of the fibers, and binder bonding the fibers together, a small, but effective amount of one or more surfactants, wetting agents, usually a wetting agent for the liquid of the slurry to be used with the mat.

The coated and uncoated mats of the invention can be woven, but typically comprise a nonwoven fibrous web bonded together with a binder and optionally coated with any coating compatible with the fibrous mat. The woven or nonwoven fibrous mats of the present invention are very permeable from the backside due to the many relatively large pores in the surface and throughout the mats as a result of relatively coarse fibers in the mat compared to the size of fibers used in paper. The fibers in the mats used in the invention can have fiber diameters greater than 23 microns and the average fiber diameter can be at least 20 microns, although typically is less than 20 microns. The Frazier air permeability of these mats is in the range of about 50 to about 1500, preferably in the range of about 175 to about 1000 and more preferably in the range of about 200 to about 800. The fibrous mat substrate can contain some cellulosic fibers, but the major portion of the fibers in the mat are non-cellulosic fibers, including ceramic fibers, synthetic organic fibers, carbon fibers, with the preferred inorganic fiber being glass fibers. The fibers, and binder holding the fibers together on the backside, rough or uncoated side, of the mat are coated with a surface active agent, typically a wetting agent for the slurry, foam precursor or other material that will be impregnated into the backside of the mat. This coating of surfactant, wetting agent, extends only part way into the thickness of the fibrous mat or fabric. On mats that are coated on one surface to make a smooth surface, the surfactant, wetting agent, can extend all the way to the backside of the coating, but on mats not having such a coating, the surfactant, wetting agent, extends only part way through the mat, typically at least 25-90 percent of the thickness of the mat such that the slurry or foam precursor will not penetrate all the way to the smooth surface of the mat when the mat of the invention is used to make mat faced boards or other laminates.

Methods of making and drying the wetting agent-coated fibrous woven or nonwoven mats are also included in the invention. The method comprises applying one or more wetting agents to the backside of a fibrous woven nonwoven mat, typically when the mat is still hot from having been heated in an oven to dry the mat or coating or both and to cure the resin binder in the mat, using one or more known techniques for coating including spraying and/or kiss coating. The heat retained in the mat will often be sufficient to volatilize the liquid carrier for the wetting agent, usually water, but can be any hydrocarbon solvent. Often it is not necessary to completely dry the treated mat because the mat will either dry completely in shipment and/or storage, or the use made of the treated mat will tolerate some moisture or liquid in the mat. Additional heat can be supplied if necessary between the end of the oven and the equipment that packages the mat, normally a winder or sheet cutter/stacker, to reduce the liquid content of the dry mat to zero or a suitable level.

Typically, the amount of surfactant, wetting agent, addition (based on active ingredient) to the backside of mat, excluding a liquid carrier, is less than about 2% by mat weight, usually less than 0.5% by mat weight, and most typically the least amount to accomplish the purpose, depending on the effectiveness of the surfactant, wetting agent, in lowering surface tension and also on the nature of the material that will be applied to the backside of the mat in a later process. Most any surfactant, wetting agent, can be used, and the choice will depend upon the intended use of the mat in making a board or laminate product. Typical surfactants include all anionic (such as sulfonates, sulfates, phosphonates, phosphate esters, sulfosuccinates), cationic (such as quaternary ammoniums, imidazolines, amidoamines), amphoterics (such as betaines, glycinates) and non-ionic (such as amine oxides, alkanolamides, ethylolated alcohols or acids or esters, polyethyleneglycols, glycerols) "fugitive" surfactants are also preferred—these few types, either due to chemistry (degrade with heat into non-suracfactants) or physical properties (are volatile) will lessen any chances of the finished gypsum board stock from rewetting example of a heat degrading type are amine oxides such as Mykon NRW-3 (Omnova, Chester, S.C.) and a volatile type is a decyndiol such as Surfynol 61 (Air Products, Allentown, Pa.)

The smooth surface used to treat the wet coating need not be on a drum, but instead can be a flat or curved conveyor such as continuous stainless steel Belt Technologies (Agawam, Mass.) conveyor or a Sandvick (Totowa, N.J.) conveyors or other similar heated, smooth belt conveyors. Another advantage of this process is that the coating covers up defects such as small wrinkles, clumps, and small holes that would otherwise cause the mat to be unsuitable as a facing material. Finished coated product will usually assume a surface as smooth or nearly as smooth as the drying surface it is subjected to as it is dried under tension.

The present invention also includes laminates comprising the coated mat of the present invention bonded to at least one other layer of material. The at least one other layer can be a layer of foam, a concrete, a gypsum wallboard or other gypsum containing material, a ceramic and other materials. The coated mat laminate of the present invention can contain any known adhesive including polymers, copolymers, molten or soft asphaltic and tar materials and other known adhesives between the coated mat layer and the at least one other layer, or the uncoated side of the mat can be bonded directly to the at least one other layer such as to foam, wall board in a known manner by placing a layer of wet foam or foam precursor on the mat and then expanding the foam and by placing the surfactant treated side of the coated mat onto a layer of wet concrete, cement or gypsum prior these materials taking a hydraulic set so that the wet concrete, cement, or gypsum penetrates the uncoated side of the mat and then sets hydraulically to bond the mat to the at least one other layer. These laminates, because of the treated mat of the present invention, have a superior surface for painting or applying other decorative materials like fabric, wallpaper, etc., than similar laminates made with prior art coated or uncoated mats.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION

Figure 1:
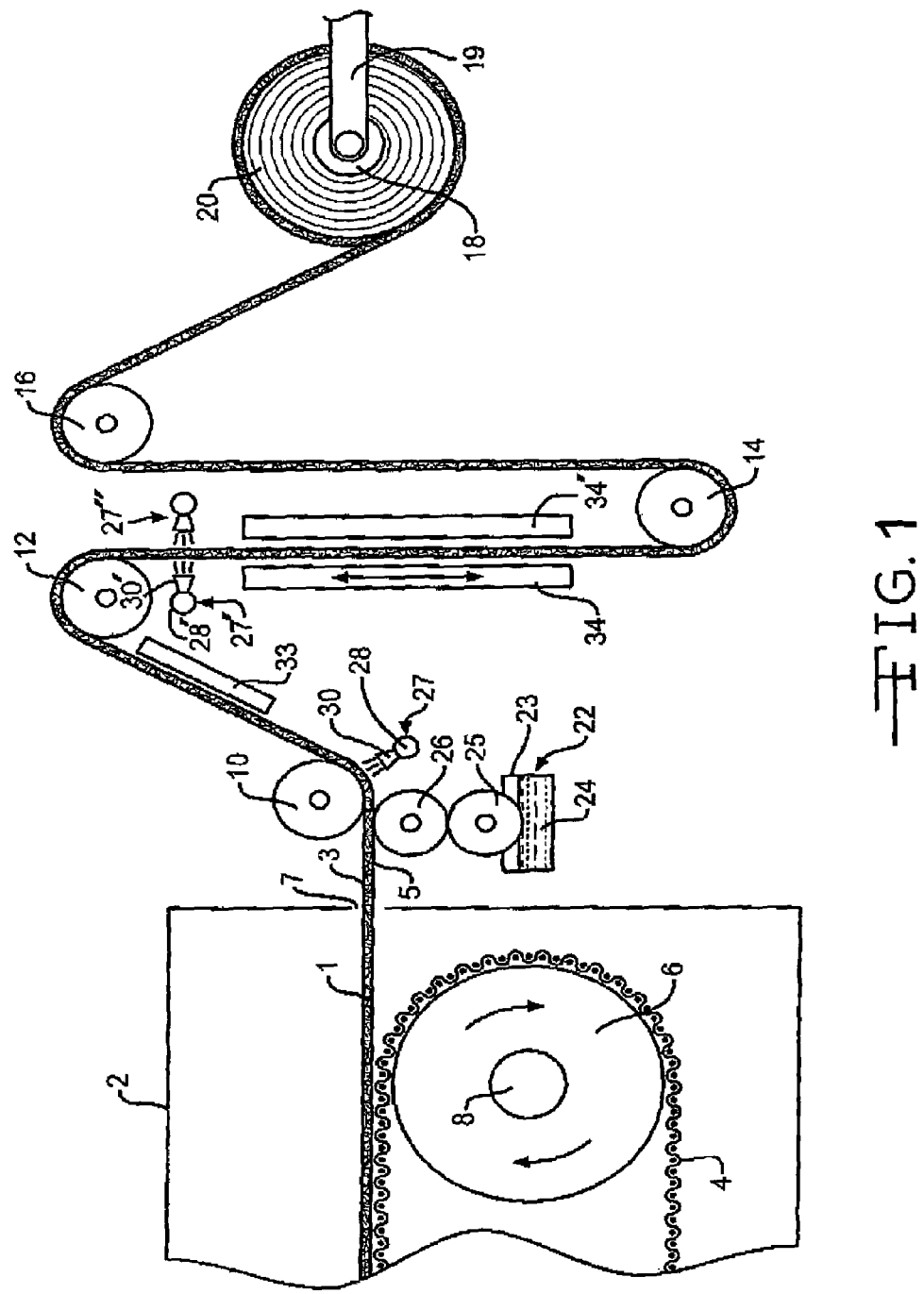
FIG. 1 is a front view of an end portion of a mat forming line showing one embodiment of the process of the invention.

FIG. 1 is a front view of the downstream end a typical mat forming line, modified according to the invention. Any mat forming system can be used in the invention including those described in U.S. Pat. Nos. 4,129,674, 4,112,174, 4,681,802, 4,810,576, and 5,484,653, the disclosures of each being hereby incorporated herein by reference. The most typically used processes for the production of mats of the invention are those processes using mat forming machines like a Hydroformer™ manufactured by Voith-Sulzer of Appleton, Wis., or a Deltaformer™ manufactured by North County Engineers of Glens Falls, N.Y. In these machines, the diluted fiber slurry flows horizontally against an inclined moving permeable belt or forming wire (not shown) where the fiber is collected and builds up in a random pattern to form a wet fibrous web while the whitewater passes through the forming wire becoming somewhat foamy (due to contained air) and is transported to a de-airing tank or pit so it can be reused. The wet fibrous web is dewatered to the desired level with a suction box to form a wet fibrous web.

This wet nonwoven fibrous web is then normally, but not necessarily, transferred to a second moving screen and run through binder applicator where an aqueous binder mix is applied to the mat in any one of several known ways, such as a curtain coater where the binder slurry is applied in excess to the wet web. Other types of conventional applicators can be used to apply the binder in a known manner. Excess binder slurry is removed by suction to a desired level and the wet, bindered mat is then run through a dryer 2 to remove the water and to cure the resin binder to lock the fibers together. The hot, dry mat 3 is then typically wound up into rolls 20 on a mandrel 18 supported by arms 19 of any type of known winder, typically an indexing winder. Other rolls 12, 16 and at least one movable accumulator roll 14 provide enough slack to allow the winder to doff the mat, rotate a finished roll 20 out of position and a fresh mandrel into winding position to start winding a new roll 20 in a known manner. It is also known to make nonwoven mats by a dry process and mats made by dry processes such as dry chopped fiber mats and continuous filament mats that are also suitable for the present invention.

All types of nonwoven mats are suitable for the present invention so long as the openings between the fibers at the surface are sufficiently small. The mats can contain fibers of glass, polymer, natural material including cellulose, and a ceramic including carbon fibers and mats containing mixtures of two or more of these different fibers. Most typically, the mat contains a major portion of glass fibers. One type of mat that is particularly useful in the present invention is a nonwoven mat made by a known wet laid process containing about 70 to about 90 wt. percent of glass fibers having an average fiber diameter of about 10 to about 23 microns, typically about 13 to about 18 microns, and about 5 to about 25 wt. percent of a cured conventional mat binder such as a modified acrylic binder, a polyvinyl acetate binder or a modified urea formaldehyde binder holding the fibers together. Such mats are commercial products being available from mat producers, such as 7611, 7502, 8440, 8573 and other fiberglass mats available from Johns Manville of Denver, Colo. For coated mats for gypsum board and the like, it is preferred that the pore size of the substrate mat on the uncoated surface be large enough for the desired degree of penetration of wet gypsum slurry to achieve good bonding of the coated mat to the gypsum board and the like in the use of the mat to make these type of laminates by known processes.

The woven or nonwoven fibrous mats used in the present invention are very permeable due to the many relatively large pores in the surface and throughout the mats. The permeability of these mats is in the range of about 50 to about 1500, preferably in the range of about 175 to about 1000 and more preferably in the range of about 200 to about 800. The nonwoven or woven mats can contain fibers only of glass, fibers only of organic material, mixtures of these fibers, only ceramic fibers, only carbon fibers or mixtures of two or more of these fibers, with or without a minority of cellulosic fibers. The organic fibers can include polyester, nylon, polyethylene, polypropylene, polyvinyl alcohol, polyvinylcholride, and other conventional synthetic or polymer fibers. The ceramic fibers can include alumina fibers, mineral wool fibers, Zirconia fibers, amorphous silica fibers, and aluminosilicate fibers and other ceramic fibers or mixtures thereof. Carbon fibers can also include graphite fibers. The fibers can be of the same diameters or different diameters including fibers having average diameters of less than 2 microns. The nonwoven mats can contain some large diameter fibers of at least 20 microns, or strands of fiber, the strands having much larger average diameters, such as the openings in the mat at the surface to be coated have an average diameter up to 250 microns or more. This coating technique even bridges and hides wrinkles as much as 0.5 inch apart, as much as 0.25 wide or wider and up to at least 150 microns.

In the process shown in FIG. 1 an uncoated, hot fibrous mat 1, carried by an oven belt 4 supported by a rotating tail pulley 6 and shaft 8 exits an oven 2 through a opening 7 and can be, while still very hot, 225 degrees F. or higher, coated on either side, usually the roughest side, with a surface active agent. Usually the top side 3 of the mat 1 is smoother than the ovenbelt-side, but in some products the side next to the oven belt 4 can be the smoothest side. In instances where the top surface 3 of the mat 1 coming out of the oven 2 is the smoothest, the back side 5 of the mat can be coated with a surfactant in any suitable manner such as using a roll over roll coater 22. In a typical roll-over-roll coater 22 a first roll 25 rotates in a pan 23 containing one or more liquid surfactants 24, containing a solvent or water medium, and picks up a layer of surfactant 24 on the surface of the roll 25 and transfers the surfactant a second coating roll 26. The coating roll 26 "kisses" the back side 5 of the hot mat 1 transferring the surfactant to the fibers and binder coated fibers in the mat. The amount of surfactant applied to the mat can be controlled by adjusting the surfactant concentration in the liquid surfactant 24 and by controlling the amount of liquid surfactant picked up by the first roll 25 in a known manner. The retained heat in the hot mat 1 drives off the water or solvent in the surfactant liquid, leaving the surfactant(s) on the fibers or cured binder coating the fibers. The degree of penetration of the surfactant into the mat is controlled by varying one or more of the surfactant concentration in the surfactant liquid 24, the amount of surfactant liquid applied to the hot mat 1, the temperature of the hot mat 1 and the speed of the tail pulley 6.

If additional surfactant is desired than is applied with the coater 22, one or more optional other coating devices can be used, either in the place of the coater 22 or in addition to the coater 22. For example, one or more spray jet coaters 27,27' comprised of a manifold 28,28' and spaced apart jet nozzles 30,30' can be used. Most typically, jet nozzles that form a mist or atomize the surfactant liquid are used to limit the amount of surfactant liquid reaching the moving back side 5 of the hot mat 1, and the depth of penetration of the surfactant liquid into the hot mat 1. Also, if required, one or more supplemental heaters 33,34 of any suitable type, such as surface combustion heaters or infra-red heaters, can be installed and used. When it is desired that the mat not transfer significant amount of surfactant to the top side 3 of the mat, the mat should be dry before it is wound up on a mandrel 18 into the roll 20 since the surfactant coated side of the mat is in contact with the top surface 3 of the mat in the roll 20. In cases where surfactant transfer doesn't matter, it is not necessary that the mat be completely dry prior to winding into the roll 20, or stacking sheets of the mat together. Where it is desired to coat the top side 3 of the hot mat 1, the coating equipment is arranged to coat that side instead of the bottom side 5, such as the optional jet spray coater 27" and optional heater 34', etc.

Figure 2:
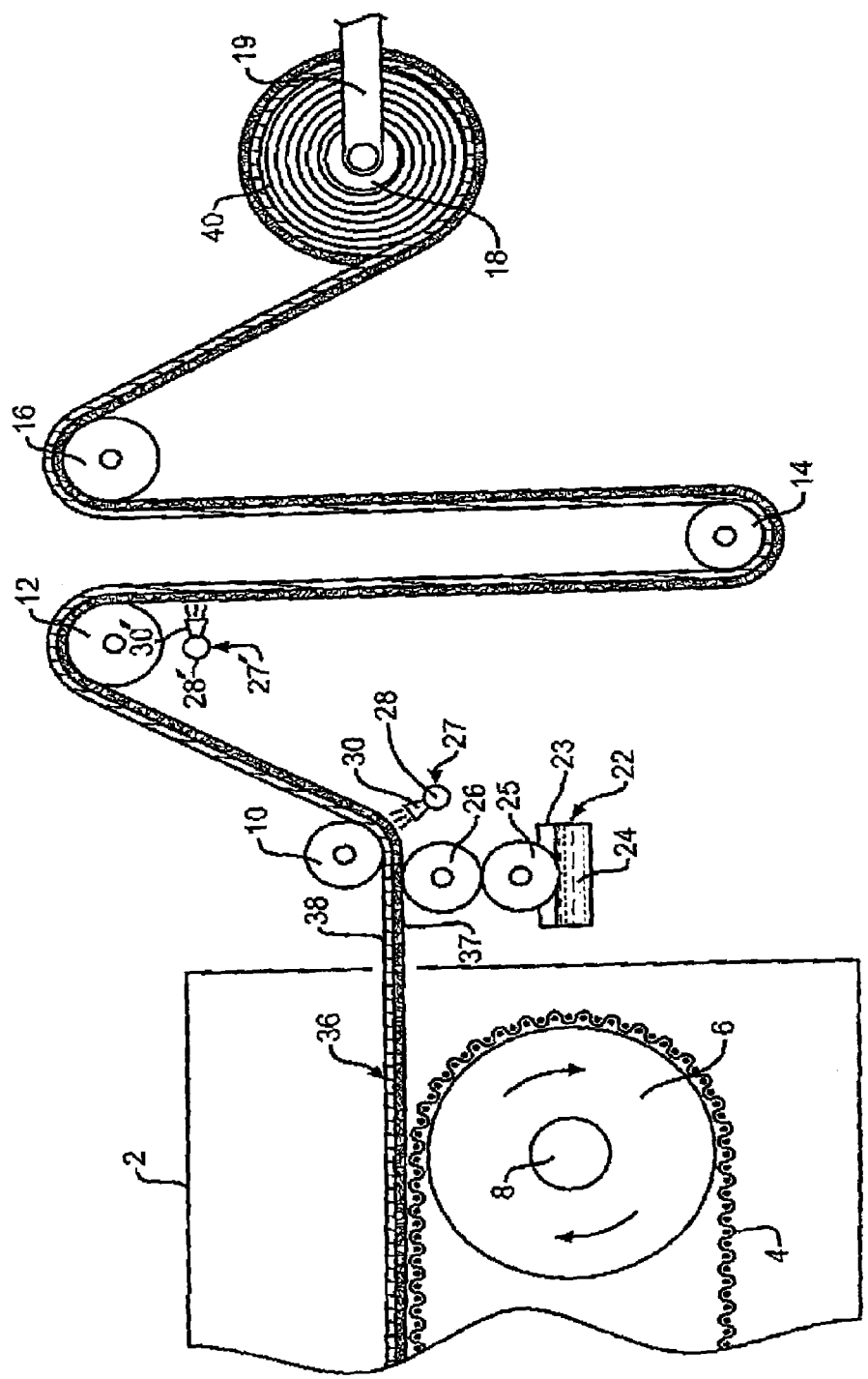
FIG. 2 is a front view of a part of an end portion of a mat coating line showing another embodiment of the process of the invention.

FIG. 2 is another embodiment that is very similar to the process shown in FIG. 1 and is a process for treating a coated mat 36. The coated mat 36 is coming from a process line like that shown in U.S. Pat. No. 6,187,697 or from an off-line mat coating process. In all such processes a fibrous mat 37 having a coating 38 on its topside is run through an oven 2 while being carried by an oven belt 4 to dry the coating 38 and optionally to cure binder in the coating 38 to produce the coated fibrous mat 36. In this embodiment, the uncoated side of the coated mat 36 is treated with a liquid containing one or more surfactants in the same manner as described above for uncoated mat, except that only the uncoated side of the mat is treated. Also, it is usually desired that the surfactant penetrate everywhere to the backside of the coating 38, usually at least slightly below the top surface of the fibrous mat 37, and usually of no concern that the surfactant penetrate the mat 37 excessively because the coating 38 will normally prevent the surfactant from reaching it's exposed surface.

Regardless of the type of coating equipment used to apply the coating, it preferably should be applied in an amount to constitute a coating weight less than about weight 2% of the dry mat, usually less than 0.5% by mat weight, and most typically the least amount to accomplish the stated purpose, depending on the effectiveness of the agent in lowering surface tension and also on the nature of the material that will be applied to the treated side of the mat in a later process.

Most any surfactant can be used, and the choice will depend upon the intended use of the mat in the making a board or laminate product. Typical surfactants include all anionic (such as sulfonates, sulfates, phosphonates, phosphate esters, sulfosuccinates), cationic (such as quaternary ammoniums, imidazolines, amidoamines), amphoterics (such as betaines, glycinates) and non-ionic (such as amine oxides, alkanolamides, ethylolated alcohols or acids or esters, polyethyleneglycols, glycerols) "fugitive" surfactants are also preferred—these few types, either due to chemistry (degrade with heat into non-suracfactants) or physical properties (are volatile) will lessen any chances of the finished gypsum board stock from re-wetting. Some examples of heat degrading type are amine oxides such as Mykon™ NRW-3, available from Omnova of Chester, S.C., and a volatile type is a decyndiol such as Surfynol™ 61, available from Air Products of Allentown, Pa. Other specific surfactants and wetting agents are known as shown by McCutcheon's Volume 1 on Emulsifiers and Detergents published by McCutcheon's Division of the M C Publishing Co., Glen Rock, N.J., the 2000 edition and any later edition.

While the preferred embodiments of the invention have been disclosed in detail, other embodiments within the described invention including those having other functional additives, known or obvious to those skilled in the art, in the coatings are considered to be part of the present invention and are intended to be included in the scope of the invention claimed below.

The invention claimed is:

1. A method of making a coated fibrous mat, the mat comprising fibers bonded together with a resin binder comprising coating a web of fibers by applying a coating to one surface of the fibrous mat and passing the mat through an oven to heat the mat to dry the coated mat and cure any binder in the coating to secure the coating to the fibrous mat, the improvement comprising applying one or more surfactants or wetting agents, to an uncoated surface of the coated mat after it exits the oven to deposit one or more surfactants or wetting agents, on the fibers and the resin binder in at least a portion of the thickness of the coated fibrous mat.

2. The method of claim 1 wherein the coated mat is cut into desired lengths and either wound into rolls or stacked, after applying the one or more surfactants or wetting agents and wherein any liquid associated with the one or more surfactants or wetting agents, is at least partially removed from the mat prior to winding or stacking the mat.

3. The method of claim 2 wherein substantially all of any liquid associated with the one or more surfactants or wetting agents added to the mat is removed from the mat by volatilizing said substantially all said liquid prior to winding or stacking the mat.

4. The method of claim 1 wherein the one or more surfactants or wetting agents are selected from the group consisting of anionic sulfonates, sulfates, phosphonates, phosphate esters, sulfosuccinates, cationic quaternary ammoniums, imidazolines, amidoamines, amphoteric betaines, glycinates non-ionic amine oxides, alkanolamides, ethylolated alcohols, ethylolated acids, ethylolated esters, polyethyleneglycols, glycerols and fugitive surfactants that degrade with heat into non-surfactants or volatilize.

5. The method of claim 2 wherein the one or more surfactants or wetting agents are selected from the group consisting of anionic sulfonates, sulfates, phosphonates, phosphate esters, sulfosuccinates, cationic quaternary ammoniums, imidazolines, amidoamines, amphoteric betaines, glycinates non-ionic amine oxides, alkanolamides, ethylolated alcohols, ethylolated acids, ethylolated esters, polyethyleneglycols, glycerols and fugitive surfactants that degrade with heat into non-surfactants or volatilize.

6. The method of claim 3 wherein the one or more surfactants or wetting agents are selected from the group consisting of anionic sulfonates, sulfates, phosphonates, phosphate esters, sulfosuccinates, cationic quaternary ammoniums, imidazolines, amidoamines, amphoteric betaines, glycinates non-ionic amine oxides, alkanolamides, ethylolated alcohols, ethylolated acids, ethylolated esters, polyethyleneglycols, glycerols and fugitive surfactants that degrade with heat into non-surfactants or volatilize.

* * * * *